(12) United States Patent
Berg et al.

(10) Patent No.: US 11,134,224 B1
(45) Date of Patent: *Sep. 28, 2021

(54) CAMERA NETWORKED BY LIGHT BULB SOCKET

(71) Applicant: Alarm.com Incorporated, Tysons, VA (US)

(72) Inventors: Benjamin Asher Berg, Washington, DC (US); Charles Richard Alpert, Snoqualmie, WA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,964

(22) Filed: Mar. 4, 2020

Related U.S. Application Data

(63) Continuation of application No. 16/299,642, filed on Mar. 12, 2019, now Pat. No. 10,587,846, which is a
(Continued)

(51) Int. Cl.
*H04N 7/18* (2006.01)
*H04N 5/225* (2006.01)
*F21V 29/70* (2015.01)
*F21K 9/237* (2016.01)
*F21K 9/233* (2016.01)
(Continued)

(52) U.S. Cl.
CPC ............. *H04N 7/183* (2013.01); *F21K 9/233* (2016.08); *F21K 9/237* (2016.08); *F21V 29/15* (2015.01); *F21V 29/70* (2015.01); *F21V 33/0052* (2013.01); *G08B 13/19617* (2013.01); *G08B 25/08* (2013.01); *H04N 5/2252* (2013.01); *H04N 5/2253* (2013.01); *H04N 5/2256* (2013.01); *H04N 5/2257* (2013.01); *H04N 7/188* (2013.01); *F21Y 2103/33* (2016.08); *F21Y 2115/10* (2016.08)

(58) Field of Classification Search
CPC ...... H04N 7/183; H04N 7/188; H04N 5/2252; H04N 5/2253; H04N 5/2256; H04N 5/2257; F21K 9/237; F21V 29/70
USPC ............... 348/151, 152, 153, 156, 159, 149; 386/226, 248
See application file for complete search history.

(56) References Cited

U.S. PATENT DOCUMENTS 10,587,846 B1 * 3/2020 Berg ...................... H04N 7/183
2003/0210340 A1 11/2003 Frederick Romanowich
(Continued)

*Primary Examiner* — Robert Chevalier
(74) *Attorney, Agent, or Firm* — Fish & Richardson P.C.

(57) ABSTRACT

Techniques are described for using an integrated lightbulb camera system for monitoring a property. The integrated lightbulb camera system can have a housing that includes one or more cameras, a power-line communication (PLC) chip, and one or more processors. The PLC chip can be configured to enable communications between the lightbulb camera system and one or more external devices. The one or more processors can be configured to control the one or more cameras to capture one or more images and control the PLC chip to transmit at least one of the one or more captured images over a power-line to at least one of the one or more external devices. The integrated lightbulb camera can also have a lightbulb compatible screw base that is configured to mount the housing to a lightbulb socket and accept electrical current that is provided to the housing.

20 Claims, 10 Drawing Sheets

Related U.S. Application Data continuation of application No. 15/490,622, filed on Apr. 18, 2017, now Pat. No. 10,271,019.

(60) Provisional application No. 62/326,457, filed on Apr. 22, 2016, provisional application No. 62/334,142, filed on May 10, 2016.

(51) Int. Cl.
  *G08B 25/08*   (2006.01)
  *F21V 33/00*   (2006.01)
  *G08B 13/196*  (2006.01)
  *F21V 29/15*   (2015.01)
  *F21Y 115/10*  (2016.01)
  *F21Y 103/33*  (2016.01)

(56) References Cited

U.S. PATENT DOCUMENTS

| | | |
|---|---|---|
| 2014/0226330 A1 | 8/2014 | Yun |
| 2015/0351204 A1 | 12/2015 | Hershberg et al. |
| 2017/0134378 A1 | 5/2017 | Corcoran et al. |
| 2019/0260920 A1 | 8/2019 | Djakovic et al. |

* cited by examiner

CAMERA NETWORKED BY LIGHT BULB SOCKET

CROSS-REFERENCE TO RELATED APPLICATIONS

This application is a continuation of U.S. application Ser. No. 16/299,642, filed Mar. 12, 2019, now allowed, which is a continuation of U.S. application Ser. No. 15/490,622, filed Apr. 18, 2017, now U.S. Pat. No. 10,271,019, issued Apr. 23, 2019, which claims the benefit of U.S. Provisional Patent Application No. 62/326,457, filed on Apr. 22, 2016 and titled "CAMERA NETWORKED BY LIGHTBULB SOCKET," and U.S. Provisional patent Application No. 62/334,142, filed on May 10, 2016 and titled "CAMERA NETWORKED BY LIGHTBULB SOCKET." All of these prior applications are incorporated herein by reference in their entirety.

TECHNICAL FIELD

This disclosure relates to home monitoring technology.

BACKGROUND

Home monitoring systems include several electronic components including sensors and appliances that may communicate with each other via a communication network to facilitate a smart home ecosystem.

SUMMARY

Techniques are described for using an integrated lightbulb camera system for monitoring a property. The integrated lightbulb camera system can have a housing that includes one or more cameras, a power-line communication (PLC) chip, and one or more processors. The PLC chip can be configured to enable communications between the lightbulb camera system and one or more external devices. The one or more processors can be configured to control the one or more cameras to capture one or more images and control the PLC chip to transmit at least one of the one or more captured images over a power-line to at least one of the one or more external devices. The integrated lightbulb camera can also have a lightbulb compatible screw base that is configured to mount the housing to a lightbulb socket and accept electrical current that is provided to the housing.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below.

DETAILED DESCRIPTION

One of the leading challenges in installing outdoor video cameras for both professionals and end users is the time and expertise involved with running a power cord through an exterior wall to a power source. The wire that runs generally must be connected either to an outlet or into an electrical box by a professional electrician. Moreover, that wire, if it passes through an outside facing wall, may require a hole to be drilled through several layers of materials. Finally, once the wire is run, the through hole generally must be weather-proofed, to prevent damage inside of the home or business. Alternatively, end users or professionals may want to mount a camera inside where they do not have electrical or network capabilities readily available, but a lightbulb socket is. Additionally, once a camera is powered on, the camera generally must then be connected to a network source. Today, the two main methods to connect the camera to the local network/internet are to either run an additional Ethernet wire or by connecting over Wi-Fi which can be unreliable and often weak outside of the home.

However, most single family, stand alone, homes in the US have some form of downward facing lighting fixture. An integrated lightbulb camera may include a power-line communication (PLC) chip, and be physically configured to screw into a lightbulb socket, e.g., a standard E27 lightbulb outlet. Unlike traditional monitoring cameras, an integrated lightbulb camera can be powered through a standard lightbulb socket, and therefore can provide easier installation than traditional outdoor cameras since installation of an integrated lightbulb camera may not involve the installation of additional wiring to the exterior of a monitored property. The lightbulb camera PLC chip capabilities allows the lightbulb socket to provide both power and network connectivity without involving complex Wi-Fi configurations. The lightbulb camera can easily communicate with the control unit, sensors, appliances, lights, and other electronic devices in and around a monitored property. By providing the camera LEDs, the camera may fully replicate the lighting functionality of a standard bulb. Moreover, the camera may be configured, to connect to a home monitoring service for remote management and control. Accordingly, installing the camera and getting it connected within a suite of home automation devices may be as easy as screwing in a lightbulb.

Figure 1:
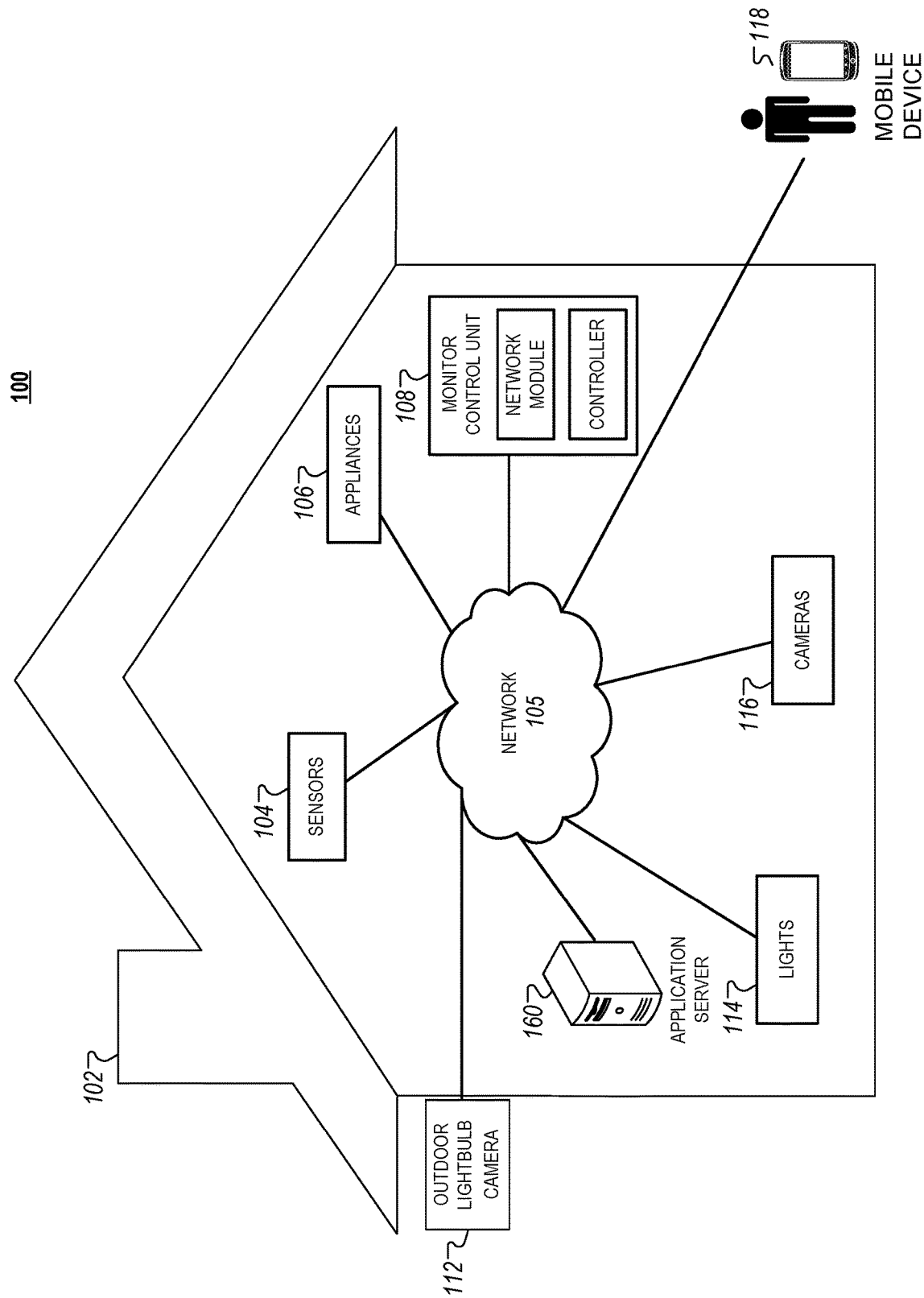
FIG. 1 illustrates a diagram of an example of a monitoring system.

FIG. 1 illustrates an example of a monitoring system 100 associated with a property 102. The monitoring system may include a network 105, sensors 104, appliances 106, a monitoring system control unit 108, a monitoring application server 110, a lightbulb camera 112, lights 114, cameras 116, and user mobile device 118. The network 105 facilitates communications between the monitoring system control unit 108, the sensors 104, the appliances 106, the lights 114, the cameras 116, the user mobile device 118, and the lightbulb camera 112.

The network 105 is configured to enable exchange of electronic communications between devices connected to the network 105. For example, the network 105 may be configured to enable exchange of electronic communications between the sensors 104, the appliances 106, the monitor control unit 108, the application server 110, the lightbulb camera 112, the lights 114, and the cameras 116. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or sub-networks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 108 includes a controller and a network module. The controller is configured to control a monitoring system (e.g., a home alarm or security system) that includes the monitor control unit 108. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitor control unit 108. The monitor control unit 108 may be configured to receive input from the lightbulb camera 112, and control the operation of the integrated lightbulb device 112.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the monitor control unit 108 to communicate over a local area network and/or the Internet. The network module also may be a voiceband modem configured to enable the alarm panel to communicate over the telephone lines of Plain Old Telephone Systems (POTS).

In some examples, the monitor control unit 108 may include data capture and recording devices. In these examples, the monitor control unit 108 may include one or more cameras 116, one or more motion sensors 104, one or more microphones, one or more biometric data collection tools, one or more temperature sensors, one or more humidity sensors, one or more air flow sensors, and/or any other types of sensors that may be useful in capturing monitoring data related to the property 102 and users associated with the property.

The monitor control unit 108 also may include a communication module that enables the monitor control unit 108 to communicate other devices of the system 100. The communication module may be a wireless communication module that allows the monitor control unit 108 to communicate wirelessly. For instance, the communication module may be a Wi-Fi module that enables the monitor control unit 108 to communicate over a local wireless network at the property 102. The communication module further may be a 900 MHz wireless communication module that enables the monitor control unit 108 to communicate directly with a monitor control unit. Other types of short-range wireless communication protocols, such as Bluetooth, Bluetooth LE, Zwave, ZigBee, etc., may be used to allow the monitor control unit 108 to communicate with other devices in the property 102.

The monitor control unit 108 further may include processor and storage capabilities. The monitor control unit 108 may include any suitable processing devices that enable the monitor control unit 108 to operate applications and perform the actions described throughout this disclosure. In addition, the monitor control unit 108 may include solid state electronic storage that enables the monitor control unit 108 to store applications, configuration data, collected sensor data, and/or any other type of information available to the monitor control unit 108.

The monitor control unit 108 may exchange communications with the sensors 104, the appliances 106, the cameras 116, the lights 114, the lightbulb camera 112, the user mobile device 118, and the application server 110 using multiple communication links. The multiple communication links may be a wired or wireless data pathway configured to transmit signals from sensors 104, the appliances 106, the cameras 116, the lights 114, the lightbulb camera 112, and the application server 110 to the controller. The sensors 104, the appliances 106, the cameras 116, the lights 114, the integrated lightbulb device 112, and the application server 110 may continuously transmit sensed values to the controller, periodically transmit sensed values to the monitor control unit 108, or transmit sensed values to the monitor control unit 110 in response to a change in a sensed value.

The multiple communication links may include a local network. The sensors 104, the appliances 106, the cameras 116, and the application server 110 and the monitor control unit 108 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The lightbulb camera 112 can be, for example, a video and/or a photographic camera, or any other type of structural component that is detachably coupled to a lightbulb socket in the exterior wall of a monitored building, and is configured to capture images of the external perimeter of the monitored building. A monitored building may be equipped with one or more lightbulb cameras. The one or more lightbulb cameras may be configured to capture audio as well as corresponding single static images of an area, and also multiple images of the area at a high frequency to produce video images. In some examples, the multiple images may be captured at a frequency of thirty images per second. The lightbulb camera 112 may be a pan/tilt camera that is configured to adjust its position to capture single static images and/or multiple images. In some examples, the lightbulb camera 112 may have a wide angle lens which increases the field of view of the lightbulb camera 112. In some examples, the lightbulb camera 112 may be another type of optical sensing device that is configured to capture images and or video.

The lightbulb camera 112 may be controlled based on commands received from the monitor control unit 108. The lightbulb camera 112 may receive commands from the monitor control unit 108 to determine whether or not images should be captured. For example, the monitor control unit 108 may send commands to the lightbulb camera 112 with time/day schedules for capturing images. The lightbulb camera 112 may be triggered to capture images and/or video by several different techniques. For example, a Passive Infra Red (PIR) motion sensor may be built into the lightbulb camera 112 and used to trigger the lightbulb camera 112 to capture one or more images when motion is detected. The lightbulb camera 112 also may include a microwave motion sensor built into the lightbulb camera 112 and used to trigger the lightbulb camera 112 to capture one or more images when motion is detected. The lightbulb camera 112 may have a "normally open" or "normally closed" digital input that can trigger capture of one or more images when external sensors (e.g., the sensors 122, PIR, door/window, etc.) detect motion or other events. In some implementations, the lightbulb camera 112 receives a command to capture an image when external devices detect motion or another potential alarm event. The lightbulb camera 112 may receive the command from the controller, the application server 110, or directly from one of the sensors 104. In some examples, the lightbulb camera 112 receives a command to capture images when an alarm alert is detected by one or more sensors within the monitored property and the detected alert is communicated to the monitor control unit 108. For example, the lightbulb camera 112 may be prompted to start capturing images when a sensor detects the garage door of the monitored property is opened. The lightbulb camera 112 may enter a low-power mode when not capturing images. In this case, the lightbulb camera 112 may wake periodically to check for inbound messages from the controller.

The lightbulb camera 112 may include one or more light emitting diode (LED) lights. The LED lights may provide white light or light of some other color. The one or more LED lights may produce sufficient lumens for the lightbulb camera 112 to function as a standard light source. As such, the lightbulb camera 112 may function as a camera and a light source simultaneously. The monitor control unit 108 may control the switching on and off of the light functionality of the lightbulb camera 112. For example, the monitor control unit 108 may send a command to switch on the light functionality at 6:00 pm each evening. In some examples, the light functionality of the lightbulb camera 112 may be switched on or off by a physical switch within the monitored property 102. In yet another example, the light functionality of the lightbulb camera 112 may be switched on or off based on an input received by a user through the user's mobile device 118. In the instances where the monitoring property may include one or more lightbulb cameras, the user may have the ability to input which camera(s) should be switched on and which camera(s) should be switched off. The user may also have the ability to alter or otherwise update timing schedules for the operation of the lightbulb camera 112 through the user's mobile device.

The lightbulb camera 112 is an integrated electronic device that is powered through a lightbulb socket. The lightbulb camera 112 may be configured to screw into a standard lightbulb socket, in some instances, connect to a bayonet style lightbulb socket, or connect to some other type of lightbulb socket. The end of the lightbulb camera 112 that connects to the lightbulb socket is complimentary in shape to the receiving socket. This end of the lightbulb camera 112 may be within the standard size dimensions for lightbulb sockets. The form factor of the lightbulb camera 112 may be within a standard object height and width for devices that connect to a lightbulb socket. For example, the size of the lightbulb camera may be proportionate the size of a standard lightbulb. The lightbulb camera 112 may also be composed of a light weight material so that weight of the camera 112 will not damage the lightbulb socket. In some implementations, e.g., where the lightbulb camera 112 does not include one or more LEDs, the lightbulb camera 112 may include a connector for detachably coupling a standard lightbulb. For example, the outer casing of the lightbulb camera 112 may include a port for screwing in an E27 lightbulb.

The lightbulb camera 112 may include an embedded PLC chip. When the lightbulb camera 112 is screwed into the lightbulb socket, the embedded PLC chip facilitates the exchange of data across the copper AC wiring that also provides power to the outdoor light camera 112. The PLC network may include a node that is connected by an Ethernet cord to the monitoring control system 108 or a router. When the PLC enabled lightbulb camera 112 is connected to a lightbulb socket, the lightbulb camera 112 is automatically connected to the network by wired communication over the electrical power wiring, and may not require a user to perform any Wi-Fi configuration as communication is not provided through Wi-Fi. The connection between the PLC access point (node) and the PLC enabled lightbulb camera 112 may involve the use of the ground pin to allow crossing between phases in a home where the circuitry involves complex phases.

When the lightbulb camera 112 is connected to the lightbulb socket, the camera communicates with, and exchanges data through a local area network with one or more of the application server 110 and the monitor control unit 108. In some instances, once the lightbulb camera is connected, the camera may be configured to communicate through the Internet. Accordingly, because the PLC network is a hard wired network and both power and networking capabilities are provided to the lightbulb camera 112 once it is screwed into the lightbulb socket, the lightbulb camera 112 is connected to the home network without the facing the reliability issues of Wi-Fi, or requiring additional electrical wiring.

The appliances 106 may be home automation devices connected to the network 105 that are configured to exchange electronic communications with other devices of the system 100. The appliances 106 may include, for example, connected kitchen appliances, controllable light sources, safety and security devices, energy management devices, and/or other types of electronic devices capable of exchanging electronic communications over the network 105. In some instances, the appliances 106 may periodically transmit information and/or generated data to the monitor control unit 108 such that the monitor control unit 108 can automatically control the operation of the appliances 106 based on the exchanged communications. For example, the monitor control unit 108 may operate one or more of the appliances 106 based on a fixed schedule specified by the user. In another example, the monitor control unit 108 may enable or disable one or more of the appliances 106 based on received sensor data from the sensors 104.

The cameras 116 may be video/photographic cameras or other type of optical sensing devices configured to capture images. In some implementations, the cameras 116 may be traditional surveillance cameras that are located throughout the interior of the monitored property. In some other implementations, the camera 116 are similar in structure and utility to the lightbulb camera 112. For instance, the cameras 116 may be configured to capture images of an area within a building monitored by the monitor control unit 108. The cameras 116 may be configured to capture single, static images of the area and also video images of the area in which multiple images of the area are captured at a relatively high frequency (e.g., thirty images per second). The cameras 116 may be controlled based on commands received from the monitor control unit 108.

The cameras 116 may be triggered by several different types of techniques. For instance, a Passive Infra Red (PIR) motion sensor may be built into the cameras 116 and used to trigger the cameras 116 to capture one or more images when motion is detected. The cameras 116 also may include a microwave motion sensor built into the camera and used to trigger the cameras 116 to capture one or more images when motion is detected. The cameras 116 may have a "normally open" or "normally closed" digital input that can trigger capture of one or more images when external sensors (e.g., the sensors 104, PIR, door/window, etc.) detect motion or other events. In some implementations, the cameras 116 receives a command to capture an image when external devices detect motion or another potential alarm event. The cameras 116 may receive the command from the controller or directly from one of the sensors 104.

The cameras 116 may be programmed with any combination of time/day schedules, system "arming state", or other variables to determine whether images should be captured or not when triggers occur. The cameras 116 may enter a low-power mode when not capturing images. In this case, the cameras 116 may wake periodically to check for inbound messages from the controller. The cameras 116 may be powered by internal, replaceable batteries if located remotely from the monitor control unit 108. The cameras 116 may employ a small solar cell to recharge the battery when light is available.

The monitoring application server 110 is an electronic device configured to provide monitoring services by exchanging electronic communications with the monitor control unit 108 and one or more user devices 118 over the network 105. For example, the monitoring application server 110 may be configured to monitor events generated by the monitor control unit 108. In this example, the monitoring application server 110 may exchange electronic communications with the network module included in the monitor control unit 108 to receive information regarding alarm events detected by the monitor control unit 108. The application server 110 also may receive information regarding events from the one or more user devices 118.

The application server 110 may store sensor and image data received from the monitoring system and perform analysis of sensor and image data received from the monitoring system. Based on the analysis, the application server 110 may communicate with and control aspects of the monitor control unit 110 or the user device 118. In some implementations, the application server may be a server of a cloud.

The user device 118 may be an electronic device associated with a property owner or an occupant that exchange network communications over the network 105. For example, the user device 118 may be smartphones, tablets, personal computers (PCs), network-enabled media players, home entertainment systems, cloud storage devices, and other types of network devices. The user device 118 may access a service made available by the application server 110 on the network 105, such as a mobile application. The data generated by the user device 118 may include over the network 105, which may be monitored by the monitor control unit 108.

The user device 118 can include a native surveillance application. The native surveillance application refers to a software/firmware program running on the corresponding mobile device that enables the user interface and features described throughout. The user device 118 may load or install the native surveillance application based on data received over a network (e.g., the network 105) or data received from local media. The native surveillance application runs on mobile devices platforms. The native surveillance application also enables the user device 118 to receive and process image and sensor data from the monitoring system.

In some implementations, the user device 118 communicates with and receive monitoring system data from the monitor control unit 110 using a communication link. For instance, the user device 118 may communicate with the monitor control unit 108 using various local wireless protocols such as Wi-Fi, Bluetooth, Zwave, Zigbee, HomePlug (Ethernet over powerline), or wired protocols such as Ethernet and USB, to connect the user device 118 to local security and automation equipment. The user device 118 may connect locally to the monitoring system, sensors 104 and other devices. The local connection may improve the speed of status and control communications because communicating through the network 105 with a remote server (e.g., the application server 118) may be significantly slower.

Figure 2:
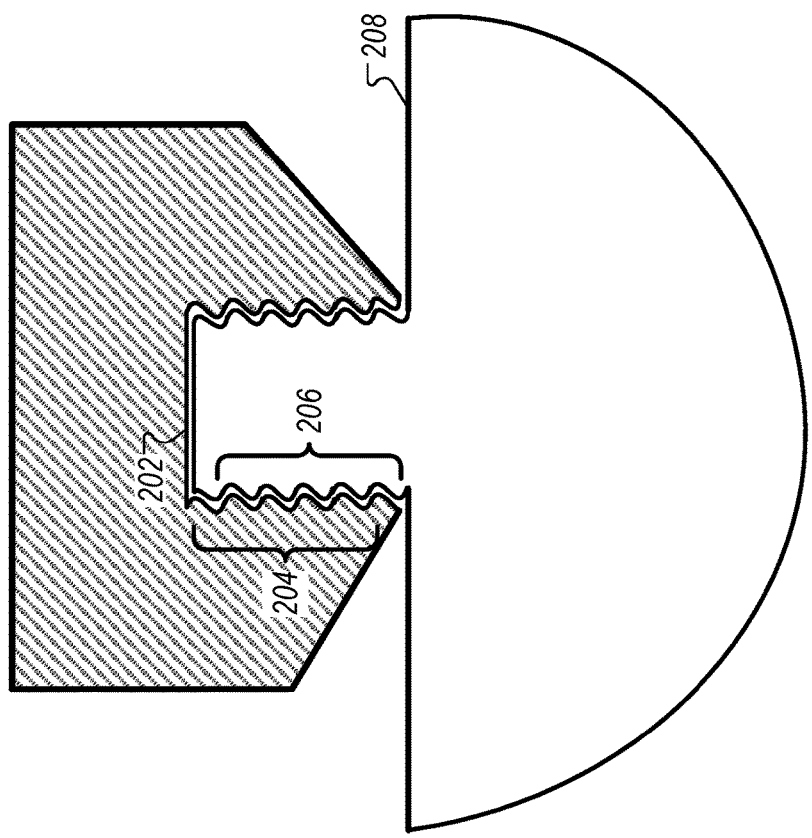
FIG. 2 illustrates a diagram of an example of an integrated lightbulb that is capable of receiving network connectivity via a lightbulb socket.

FIG. 2 illustrates an example of an integrated lightbulb device 208 that is connected to a lightbulb socket 202. The integrated lightbulb device 208 includes a connecting portion 206 that is complimentary to the shape of the intake portion 204 of the lightbulb socket 202. In some instances, where the lightbulb socket is a screw type socket, the connecting portion 206 of the device 208 is a screw type. In these instances, the device 208 is connected to the lightbulb socket by screwing in the device 208 until the device 208 is secured. In other instances, the lightbulb socket may be a bayonet style socket.

The device 208 may include one or more white LEDs that produce sufficient light so that the device 208 can function as a light source and a sensor simultaneously. In some implementations, the LEDs may be other colors to provide light of that color. The device 208 is embedded with a Powerline chip and includes electrical circuitry that can optionally utilize a ground pin. The integration of PLC into the circuitry of the device 208 may decrease the power draw compared to a separate PLC device and a separate monitoring sensor. The device 208 may also reduce issues that may be arise due to excess heating of the device 208. The size of the lightbulb device 208 may be proportionate to the size of lightbulb, and may be within a standard height and width for the lightbulb. The lightbulb device 208 may also be composed of a light weight material.

In some implementations, the integrated lightbulb device 208 may be a monitoring device that does not include light functionality. For example, the camera does not include any LEDs for providing illumination as a light source. The integrated lightbulb device may include a connector for attaching a standard bulb to the lightbulb socket in conjunction with the device. For example, the integrated device may include a pass-through that allows a standard lightbulb to connect to the socket. The integrated lightbulb device 208 may include a monitoring sensors that is a camera, a speaker, a sensor, an alarm, a doorbell device, or any other suitable electronic device that requires power/and or network connectivity, and may be integrated into a smart home ecosystem.

Figure 3:
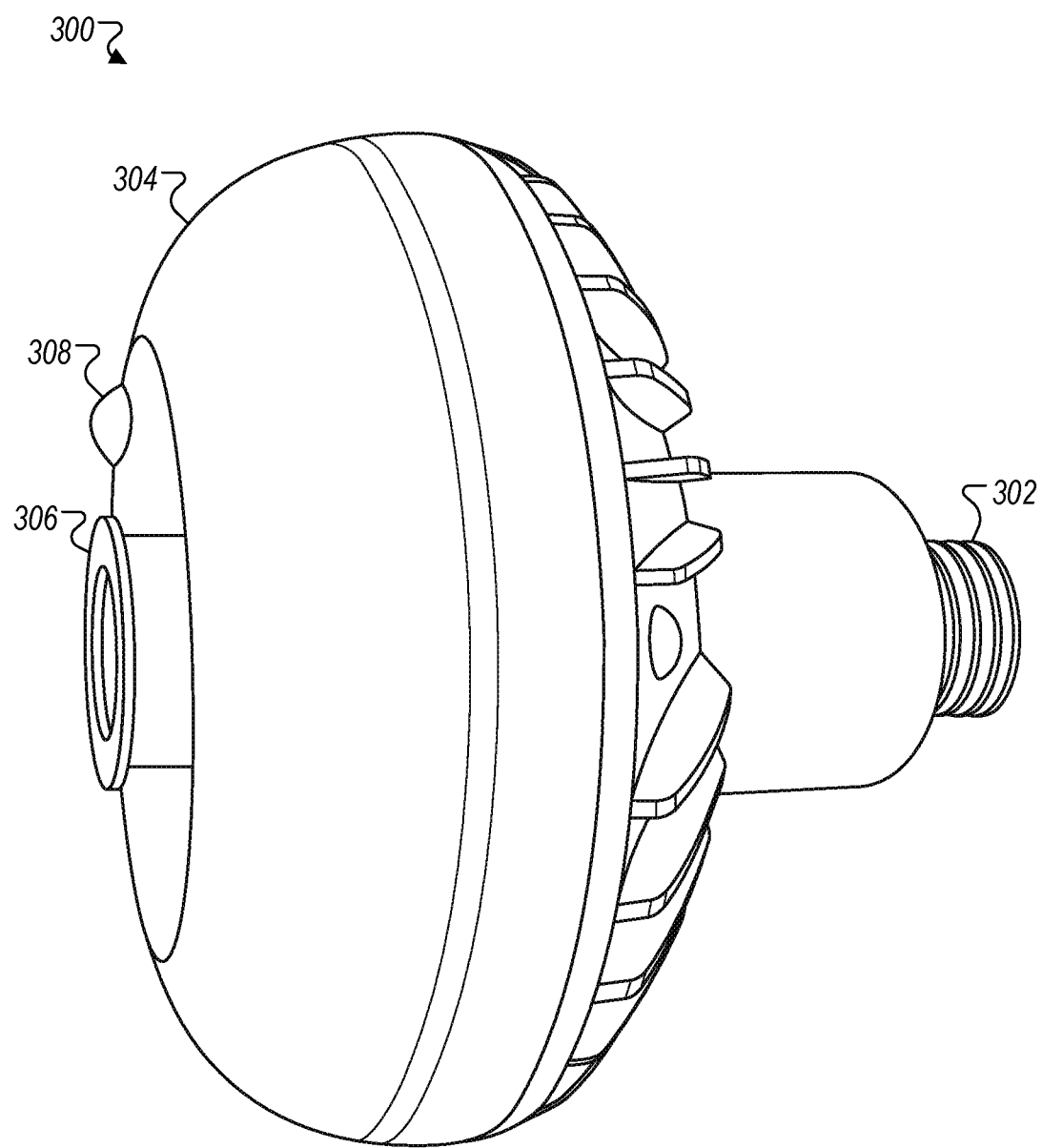
FIG. 3 illustrates an example of an integrated lightbulb camera system with a diffuser.

FIG. 3 illustrates an example of an integrated lightbulb camera system 300. The system 300 includes a housing that is attached to a lightbulb screw base 302. The housing includes multiple layered components, which are illustrated in detail in FIGS. 4A-4E. The components included in the housing that are viewable in the figure includes a front cover 304 that surrounds a camera lens cover 306 on a front side of the housing opposite to a side that attaches to the lightbulb screw base 302. The front surface of the housing includes a motion sensor 304 that is secured in place using a motion sensor seal (not shown).

In the example depicted, the screw base 302 can be mounted into a standard-sized lightbulb socket (e.g., an E26/E27 lightbulb socket), or any other suitable sized lightbulb socket. Once the screw base 302 is mounted into the lightbulb socket, the housing can receive electric current through the lightbulb socket as described above.

Figure 4A:
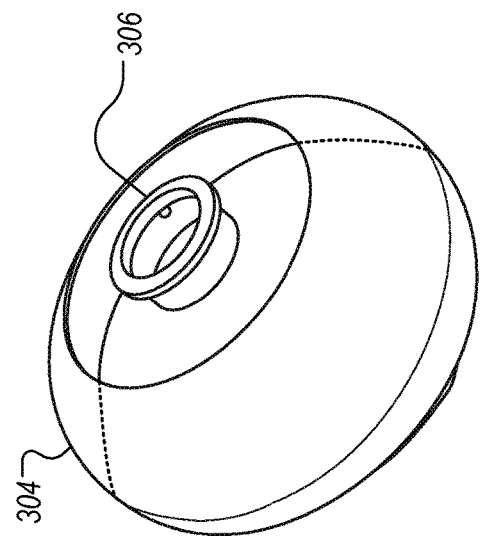
FIGS. 4A-4E illustrate detailed views of components within a housing of the integrated lightbulb camera system illustrated in FIG. 3.
Figure 4B:
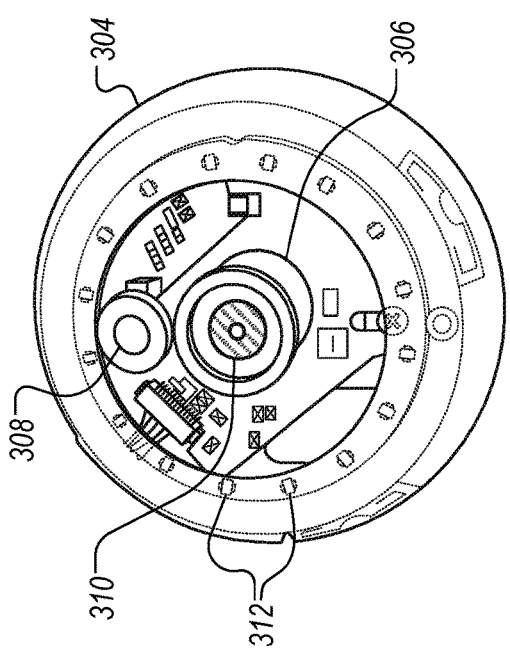

The front cover 304 can be composed of transparent or translucent material that allows for passage of light produced by light sources that are placed underneath the front cover 304. Exemplary configurations of light sources are illustrated in FIGS. 4A-4B. In some implementations, front cover 304 can function as a diffuser that diffuses, spreads out, or scatters light produced by the light sources to provide soft light. The curvature of the front cover 304 as shown can be used to spread the produced light produced to a wide angle in a similar manner as wide-angle floodlight lightbulbs.

FIGS. 4A-4B illustrate detailed views of the front side of the integrated lightbulb camera system illustrated in FIG. 3. Referring initially to FIG. 4A, a top view of the front side of the system 300 is illustrated. The front cover 304 surrounds and partially covers a circuit board (shown in greater detail in FIGS. 4C-4E) of the system 300. The camera lens cover 306 extends away from the top of the front cover 304 and surrounds a camera sensor 310. In the example depicted, an array of LEDs 312 is placed on top of the circuit board and used as light sources to produce light that passes through the front cover 304 as described above.

Referring now to FIG. 4B, a perspective view of the housing of the system 300 is illustrated. In this example, the circuit board is covered to prevent exposure of electrical components when, for example, the system 300 is used in an external environment. The light sources (not shown), in this example, can be situated on top of the cover and underneath the front cover 304 such that produce light can be transmitted through the front cover 304 as the cover protects the electrical components of the circuit board underneath.

Figure 4C:
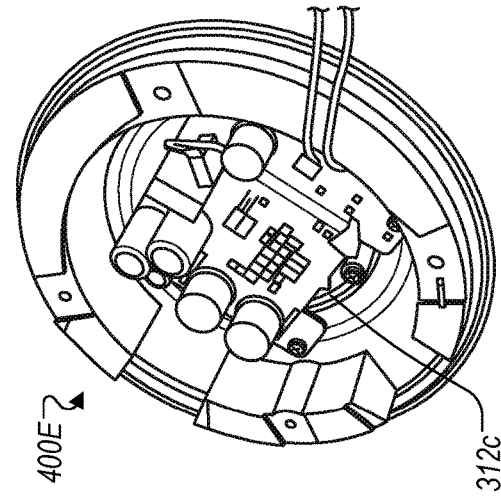
Figure 4D:
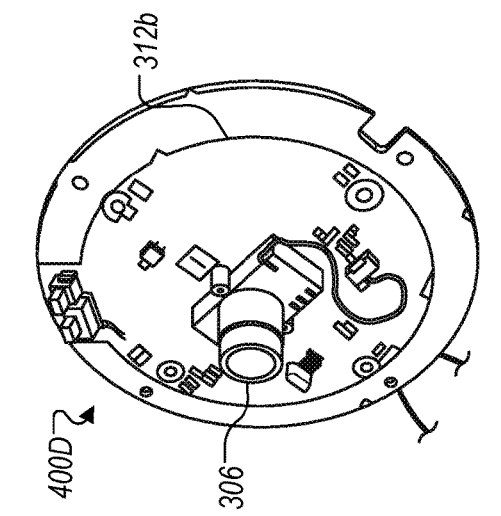
Figure 4E:
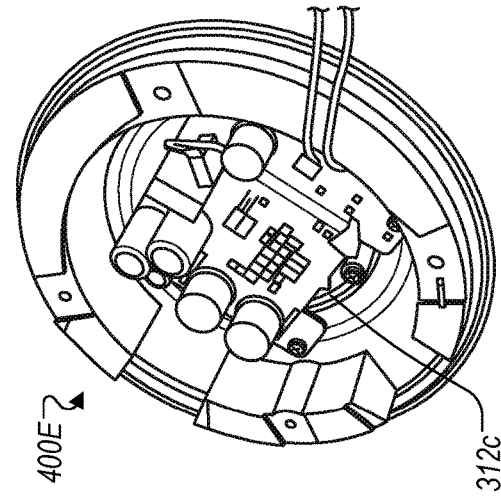

FIGS. 4C-4E illustrate detailed views of structures 400C-400E, respectively, that include corresponding circuit boards 312a-c of the integrated lightbulb camera system of FIG. 3. Each of the circuit boards 312a-c include one or more electrical circuits that enable corresponding electronic components to receive electrical current that is received from the lightbulb socket through the lightbulb screw base 302. For example, the circuit board 312a can provide electrical current to the motion sensor 308 and the LED, the circuit board 312b can provide electrical current to the camera sensor 310, and the circuit board 312c can receive and process electrical current received from the lightbulb screw base 302 and provide the received electrical current to the circuit boards 312a and 312b (and other electronic components of the system 300).

The structures 400C-E can be stacked on top of one another when assembled to form a portion of the housing of the system 300 that is placed underneath the front cover 304. For example, the structure 400C can be placed on top of the structure 400D so that the camera lens cover 306 that protrudes from the circuit board 312b can pass through a recess 315 of the structure 400C. The structure 400E can be attached underneath the structure the structure 400D such that, when assembled, the structure 400D is an intermediate structure between the structures 400C and 400E. The structures 400C-E can be secured using, for example, screws that pass through threaded holes of the structures 400D and 400E and the structure illustrated in FIGS. 4A and 4B.

Figure 5:
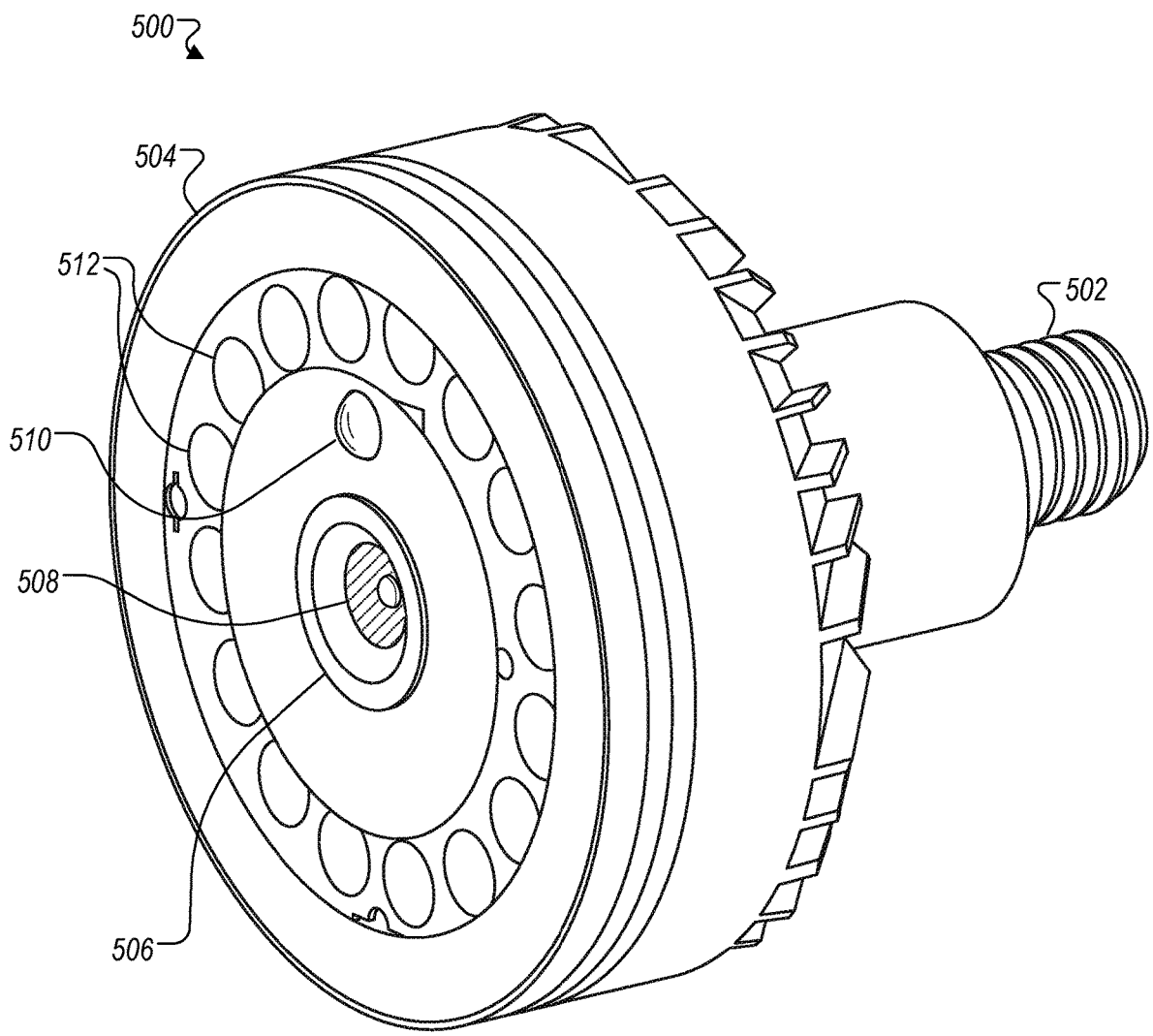
FIG. 5 illustrates an example of an integrated lightbulb camera system without a diffuser.

FIG. 5 illustrates an example of an integrated lightbulb camera system 500. For example, the system 500 can be an alternate implementation of the system 300 that does not include a front cover (e.g., a diffuser). The system 500 includes a housing that is attached to a lightbulb screw base 502. The housing includes multiple layered components, which are illustrated in detail in FIG. 6A. The components included in the housing that are viewable in the figure includes a front cover 504 that surrounds a camera lens cover 506 encompassing a camera sensor 508 on a front side of the housing opposite to a side that attaches to the lightbulb screw base 502. The front surface of the housing also includes a motion sensor 506 that is secured in place using a motion sensor seal (not shown), and an arrangement of openings 512 that allow the passage of light produced by light sources (not shown).

Figure 6A:
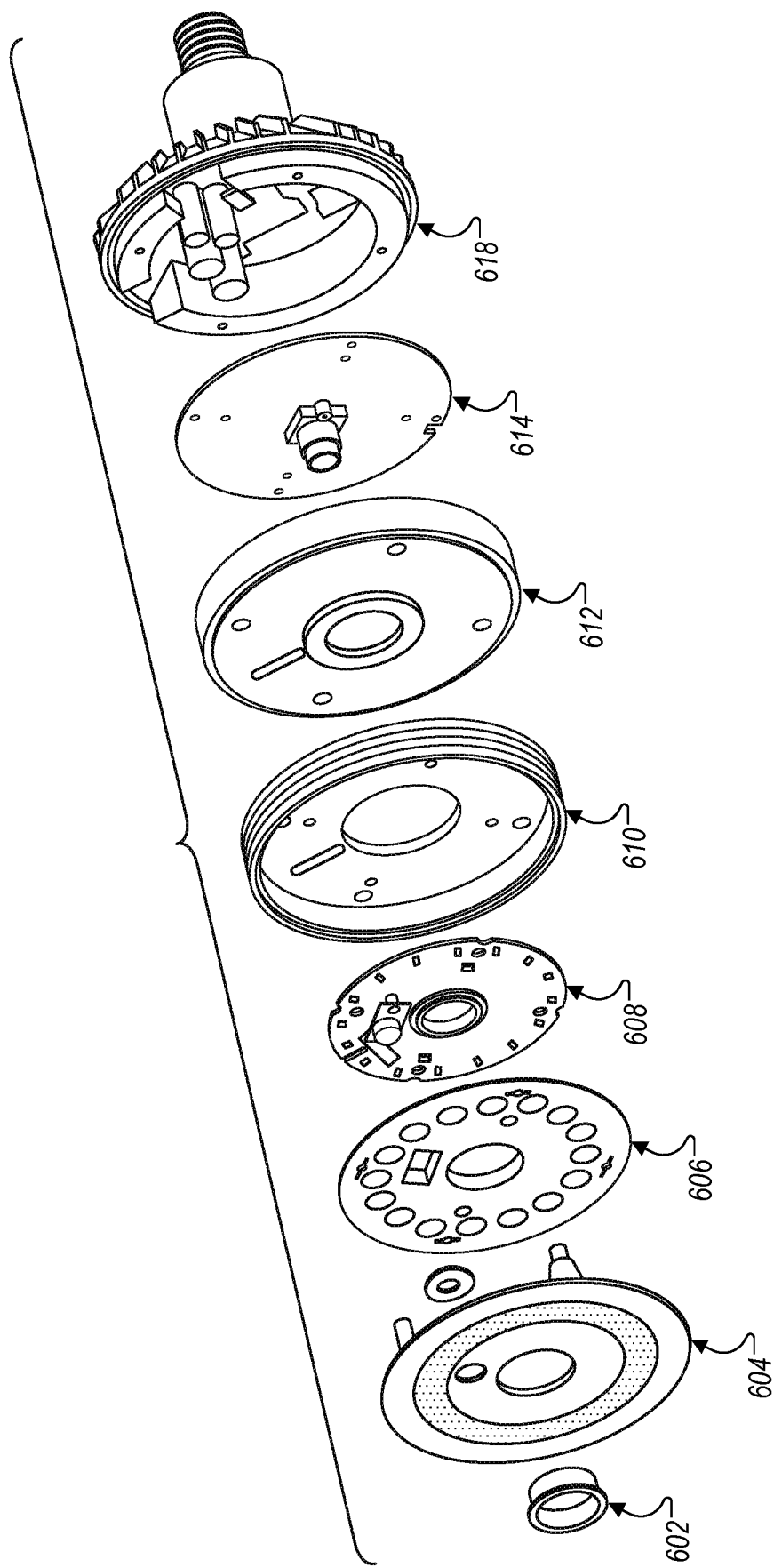
FIG. 6A-6C illustrate detailed views of components within a housing of the integrated lightbulb camera system illustrated in FIG. 5.
Figure 6B:
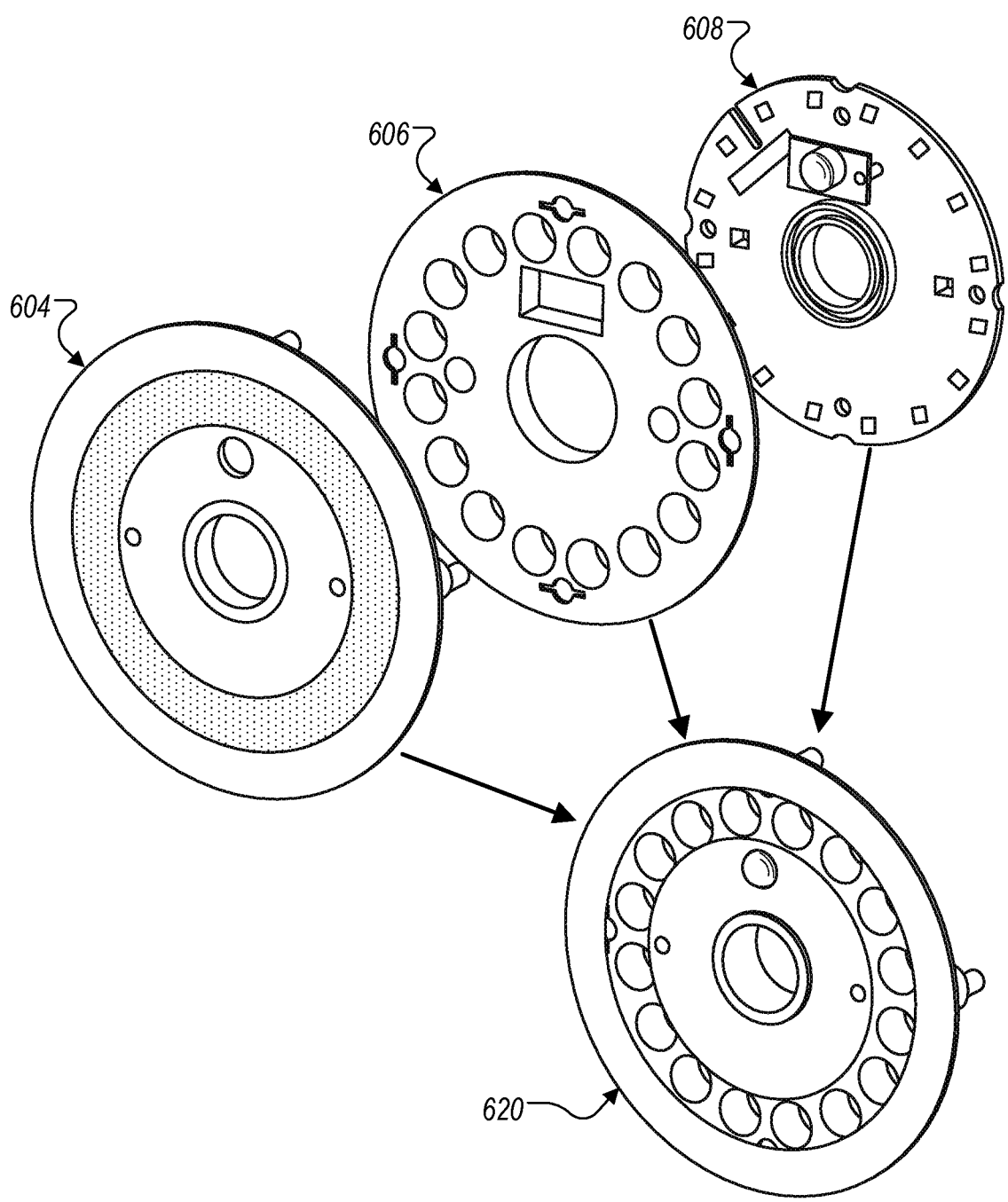

FIG. 6A-6B illustrate detailed views of components within a housing of the integrated lightbulb camera system 500 illustrated in FIG. 5. Referring initially to FIG. 6A, an arrangement of components within the housing of the system 500 are illustrated. Briefly, the arrangement includes a camera lens cover 602, a front cover 604, a reflector panel 606, a circuit board 608, a heat sink 610, an insulator 612, a circuit board 614, and an assembly 618. When assembled, each of the components can be placed on top of one another as depicted in the figure to form the system 500. The assembly process is illustrated in detail in FIG. 6B.

Referring to the depicted components, the camera lens cover 602 can be used to secure and protect the camera sensor attached to the circuit board 614. The front cover 604 can include a transparent or translucent ring that is placed in front of the holes of the reflector panel 606 to enable the passage of light produced by LEDs placed on the circuit board 608. The transparent ring can be made to minimize diffusion and/or light absorption by the front cover 604.

The reflector panel 606 includes a circular arrangement of holes that focuses the light produced by the LEDs placed on the circuit board 608. For example, each hole of the reflector panel can be aligned with a position of an individual LED to increase the luminous intensity of the light produced by each LED. In some implementations, the reflector panel 606 can The circuit boards 608 and 614 each include one or more electrical circuits that enable corresponding electronic components to receive electrical current that is received from the lightbulb socket through the lightbulb screw base 502, which is attached to the bottom of the assembly 618. For example, the circuit board 608 can provide electrical current to motion sensors and attached LEDs and the circuit board 614 and provide electrical current to the camera sensor 508.

In some implementations, the circuit board 614 can include one or more wireless communication modules (e.g., Wi-Fi antennas) that enable the system 500 to exchange wireless communications with external devices (e.g., monitoring system devices of a property where the system 500 is located). The wireless modules can be placed to improve wireless signal transmission (e.g., placing the wireless communication modules perpendicular to the front surface of the system 500). In addition, if multiple wireless communication modules are included, modules can be arranged on the circuit board 614 to maximize wireless signal transmission and reception. For example, if two wireless communication modules are used, each individual module can be placed on opposite sides of the circuit board 608 to maximize wireless signal coverage along each side of the system 500.

The assembly 618 includes a circuit board that includes one or more electrical currents that are capable of receiving and processing electrical current received from the lightbulb screw 502 and provide the received electrical current to the circuit boards 608 and 614 (and other electrical components of the system 500).

The heat sink 610 can be included within the assembly to improve handling of heat produced by electronic components of the system 500. For example, the heat sink 610 is situated underneath the circuit board 608 encapsulate it within a heat-contained chamber that is exposed to outside air for dispensing heat produced by the LEDs (e.g., using any type of convection or radiation cooling) to prevent the camera sensor 508 from overheating. The camera sensor 508 can be tightly enclosed within the chamber by the heat sink 610, which allows the heat sink 610 to absorb substantially all of the heat produced by the components of the circuit board 608. The heat sink 610 can be made of any suitable material (e.g., aluminum) to divert heat away from the camera sensor 508.

The insulator 612 can be placed between the heat sink 610 and the circuit board 614 to reduce the transfer of heat produced by the LEDs on the circuit board 608 to the circuit board 614, which includes electronic components related to the camera sensor 508. The insulator 612 can be composed of any material with a suitable insulating capability (e.g., a low thermal conductivity). As examples, the insulator 612 can be made from ceramic reinforced plastic, fiberglass, mineral wool, polyurethane foam, polystyrene, among others.

The assembly 618 includes the lightbulb screw base 502 on the bottom, which enables a circuit board to receive electrical current from a lightbulb socket. The circuit board can include a PLC chip, as discussed above, which enables the system 500 to transmit network communications from through a power-line associated with the lightbulb socket. The circuit board can also include one or more components that are capable of transmitting power to the other electronic components of the system 500 (e.g., electronic components of the circuit boards 608 and 612).

In some implementations, one or more of the components of the system 500 can correspond to components of the system 300. For example, the circuit board 608 can correspond to the circuit board 312a illustrated in FIG. 4C, the circuit board 614 can correspond to the circuit board 312b illustrated in FIG. 4D, and the circuit board of the assembly 618 can correspond to the circuit board 312c illustrated in FIG. 4E. In addition, the entirety of the assembly 618 can also correspond to the structure 400E illustrated in FIG. 4E. In this regard, certain components of each of systems 300 and 500 can be interchanged during manufacturing and assembly of the integrated lightbulb camera.

Figure 6C:
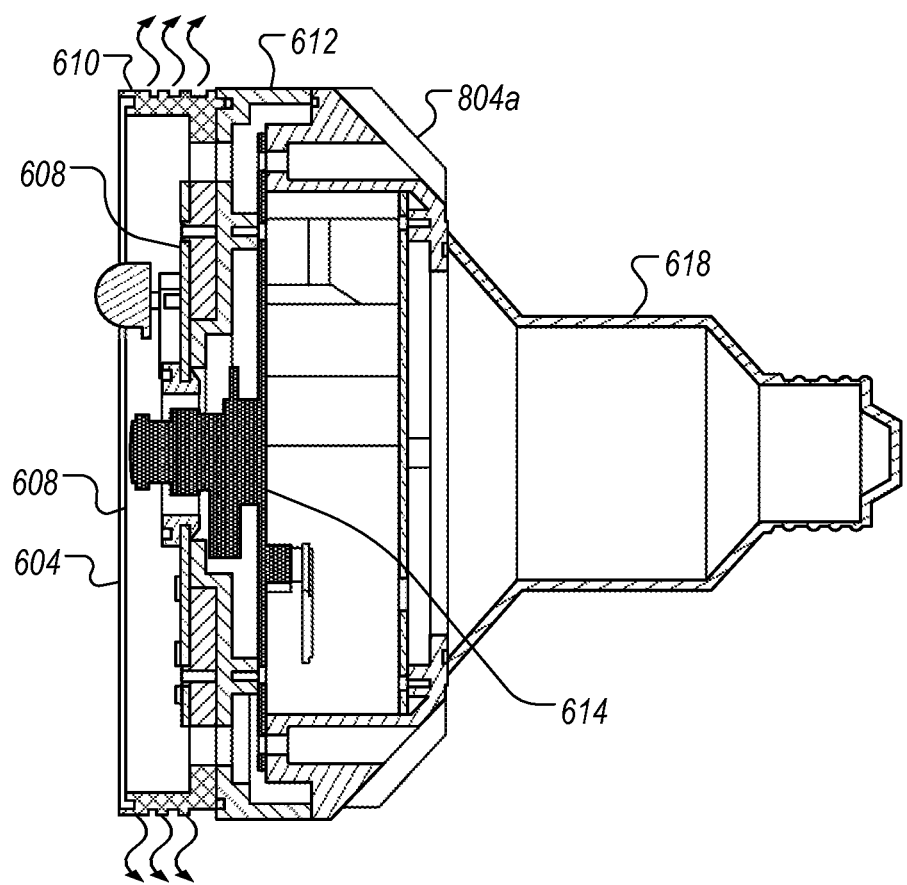

Referring now to FIG. 6B, a detailed view of an assembly 620 of a housing of the integrated lightbulb camera system 500 is depicted. To form the assembly 620, the front face 604 is placed on top of the reflector panel 606, which is then placed on top of the circuit board 608. The other components of the housing can be placed in a similar arrangement as depicted in FIG. 6A. The components can be aligned and attached using and screws (not shown) that are passed through threaded holes in designated locations of the each of the components 604, 606, and 608. In some implementations, O-rings of designated thicknesses can be inserted to create spacing between components (e.g., between the front face 604 and the reflector panel 606). In the example depicted, the assembly 620 represents a front side of the system 500. For example, as described above, the transparent ring of front face 604 allows the passage of light produced by LEDs of the circuit panel 608. In addition, the holes of the reflector panel 606 can be aligned with each LED to direct the intensity of light produced. FIG. 6C illustrates a detailed side of view of the integrated lightbulb camera system 500 after the components depicted in FIG. 6A have been assembled together as described above.

Figure 7:
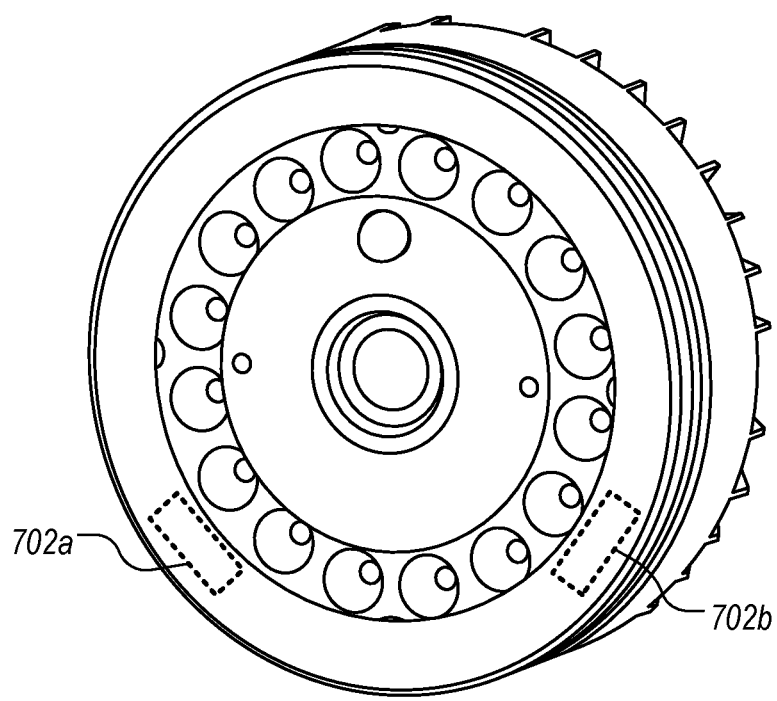
FIG. 7 illustrates examples of wireless antennas that can be placed on the integrated lightbulb camera system illustrated in FIG. 5.

FIG. 7 illustrates examples of wireless antennas 702a and 702b that can be placed on the integrated lightbulb camera system 500. The wireless antennas 702a and 702b can be placed underneath the front cover 604 but above the reflector panel 606 (e.g., on an inner face of the front cover 604 that faces away from the front side of the system 500). As described above, the Wi-Fi antennas 702a and 702b can be used to provide wireless network communications to the system 500 with one or more external devices. For example, the Wi-Fi antennas 702a and 702b can enable the system 500 to connect to a wireless local area network of a property (e.g., the network 105 within the property 102 as depicted in FIG. 1).

The Wi-Fi antennas 702a and 702b can provide an additional, or alternative, means of providing network connectivity to the system 500. For example, the Wi-Fi antennas 702a and 702b can be used to provide network connectivity in circumstances where there is no electrical current being provided to the PLC chip via the power-line of the lightbulb socket (e.g., when an associated lightbulb switch is set to "OFF"). In such examples, the system 500 can include a battery that serves as a temporary power supply for the components of the system 500 (e.g., the camera sensor 508). In this regard, the Wi-Fi antennas 702a and 702b can provide network connectivity to the system 500 in circumstances when the power-line is turned off.

In some implementations, the Wi-Fi antennas 702a and 702b and the PLC chip can be used in parallel to exchange different types of data communications over a network. For example, the PLC chip can be used to transmit large data file (e.g., video footage collected by the camera sensor 508), whereas the Wi-Fi antennas 702a and 702b can be used to transmit low-bandwidth data signals (e.g., status signals that are sent to the control unit 110).

Figure 8:
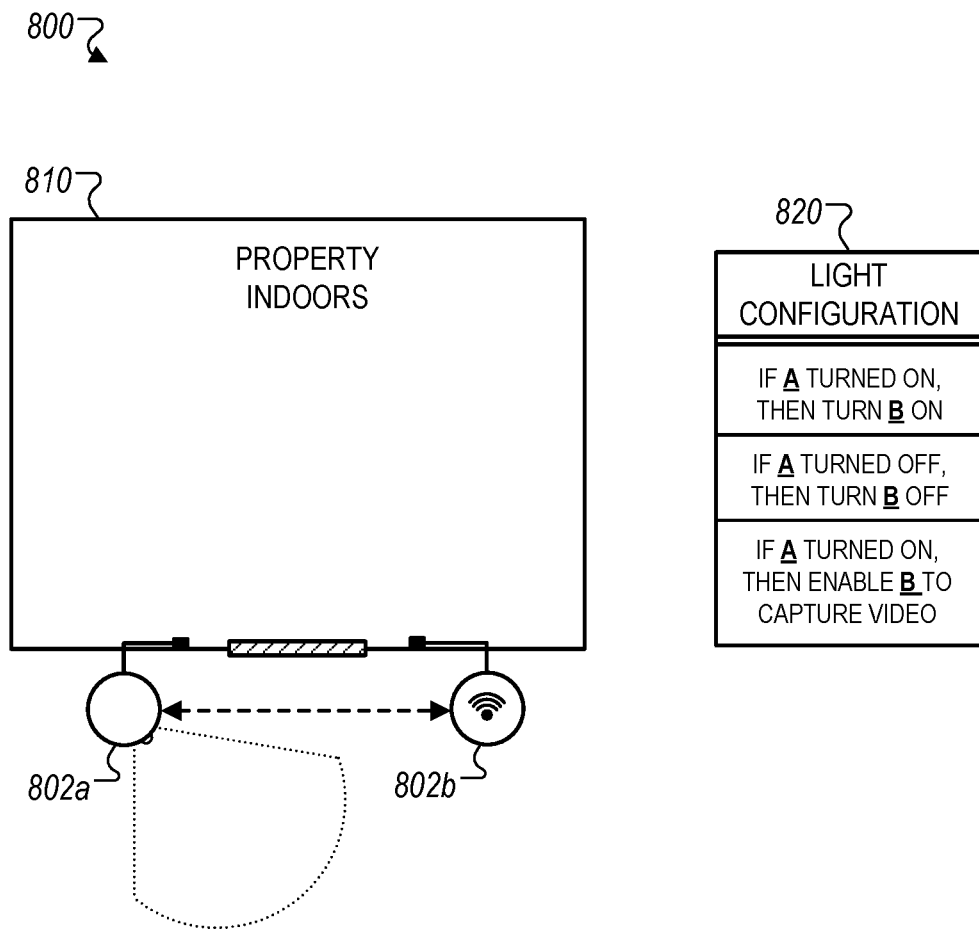
FIG. 8 illustrates an example of a system that includes an integrated lightbulb camera that can be controlled based on the operation of a network-enabled lightbulb.

FIG. 8 illustrates an example of a system 800 that includes an integrated lightbulb camera 802a that can be controlled based on the operation of a network-enabled lightbulb 802b. In the example depicted, the lightbulb camera 802a can be placed in an exterior of a property 810 (e.g., near the front door, a backdoor, or a side door) to capture security video footage of the property exterior. The lightbulb camera 802a is powered through an existing power-line that provides electrical current to exterior lights outside of the property 810. The existing power-line is activated based on detected motion near the front door of the property. For instance, the power-line can be configured to provide power to a light socket when motion is detected by a motion detector, and terminate power when motion is not detected.

During the installation process for the lightbulb camera 802a, the motion-activation for the existing power-line is disabled to enable a consistent power supply to the lightbulb camera 802a regardless of detected motion near the exterior of the property. As a result of this adjustment, the existing power-line continuously provides power to the lightbulb socket, which can significantly increase power consumption. To address this limitation, the system 800 includes the network-enabled lightbulb 802b, which can be used to adjust the operation of the lightbulb camera 802a.

The lightbulb 802b can be any type of network-enabled lightbulb that is capable of transmitting and receiving wireless communications using, for example, a wireless communication module such as a Wi-Fi antenna. For instance, the lightbulb 802b can be capable of exchanging communications with a monitoring system of the property 810. In addition, the lightbulb 802b can be capable of transmitting wireless control signals to adjust the operation of the lightbulb camera 802a without needing motion detection.

The system 800 can utilize a lightbulb configuration 820 to selectively control the operation of the lightbulb camera 802a based on the operation of the lightbulb 802b. For example, the light configuration 820 specifies instructions that provides power on to the lightbulb camera 802a when the lightbulb 802b is turned on, instructions that remove power to the lightbulb camera 802a when the light bulb 802b is turned off, and instructions for the lightbulb camera 802a to enable video capture using its camera when the lightbulb 802a is turned. In these examples, the lightbulb camera 802a and the lightbulb 802b have a master-slave configuration where the lightbulb camera 802a is configured based on the operation of the lightbulb 802b.

In alternative implementations, the system 800 can be configured to enable bi-directional command transmission between the lightbulb camera 802a and the lightbulb 802b. In such implementations, operation of the lightbulb camera 802a can be used to adjust the operation of the lightbulb 802b. For example, once the lightbulb camera 802a has completed transmitting collected video footage to a control unit, lightbulb camera 802a transmits an instruction lightbulb 802b to turn it off.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   determining that a network-enabled lightbulb is associated with a lightbulb camera system that comprises one or more cameras and one or more lights;
   determining that a configuration of the one or more cameras or one or more lights has been adjusted; and
   based on determining that the configuration of the lightbulb camera system has been adjusted, transmitting a command to adjust a configuration of the network-enabled lightbulb.

2. The method of claim 1, wherein:
   determining that the configuration of the one or more cameras or one or more lights has been adjusted comprises determining that the one or more cameras has been turned on; and
   transmitting the command to adjust the configuration of the network-enabled lightbulb comprises transmitting a command to turn on the network-enabled lightbulb.

3. The method of claim 1, wherein:
   determining that the configuration of the one or more cameras or one or more lights has been adjusted comprises determining that the one or more cameras has been turned off; and
   transmitting the command to adjust the configuration of the network-enabled lightbulb comprises transmitting a command to turn off the network-enabled lightbulb.

4. The method of claim 1, wherein
   determining that the configuration of the one or more cameras or one or more lights has been adjusted comprises determining that the one or more lights has been turned on; and transmitting the command to adjust the configuration of the network-enabled lightbulb comprises transmitting a command to turn on the network-enabled lightbulb has been turned on.

5. The method of claim 1, wherein the lightbulb camera system is placed within a vicinity of a location of the network-enabled lightbulb.

6. The method of claim 1, wherein the lightbulb camera system further comprises:
one or more processors;
a power-line communication (PLC) chip that is configured to enable communications between the lightbulb camera system and the network-enabled lightbulb;
a housing that encloses:
the one or more cameras,
the one or more lights, and
the PLC chip; and
a lightbulb compatible screw base configured to (i) mount the housing to a lightbulb socket, and (ii) accept electrical current that is provided to the one or more cameras, the one or more lights, and the one or more processors.

7. The method of claim 1, wherein the one or more lights are light emitting diodes (LEDs).

8. A system comprising:
one or more computers; and
one or more storage devices storing instructions that, when executed by the one or more computers, cause the one or more computers to perform operations comprising:
determining that a network-enabled lightbulb is associated with a lightbulb camera system that comprises one or more cameras and one or more lights;
determining that a configuration of the one or more cameras or one or more lights has been adjusted; and
based on determining that the configuration of the lightbulb camera system has been adjusted, transmitting a command to adjust a configuration of the network-enabled lightbulb.

9. The system of claim 8, wherein:
determining that the configuration of the one or more cameras or one or more lights has been adjusted comprises determining that the one or more cameras has been turned on; and
transmitting the command to adjust the configuration of the network-enabled lightbulb comprises transmitting a command to turn on the network-enabled lightbulb.

10. The system of claim 8, wherein:
determining that the configuration of the one or more cameras or one or more lights has been adjusted comprises determining that the one or more cameras has been turned off; and
transmitting the command to adjust the configuration of the network-enabled lightbulb comprises transmitting a command to turn off the network-enabled lightbulb.

11. The system of claim 8, wherein
determining that the configuration of the one or more cameras or one or more lights has been adjusted comprises determining that the one or more lights has been turned on; and
transmitting the command to adjust the configuration of the network-enabled lightbulb comprises transmitting a command to turn on the network-enabled lightbulb has been turned on.

12. The system of claim 8, wherein the lightbulb camera system is placed within a vicinity of a location of the network-enabled lightbulb.

13. The system of claim 8, wherein the lightbulb camera system further comprises:
one or more processors;
a power-line communication (PLC) chip that is configured to enable communications between the lightbulb camera system and the network-enabled lightbulb;
a housing that encloses:
the one or more cameras,
the one or more lights, and
the PLC chip; and
a lightbulb compatible screw base configured to (i) mount the housing to a lightbulb socket, and (ii) accept electrical current that is provided to the one or more cameras, the one or more lights, and the one or more processors.

14. The system of claim 8, wherein the one or more lights are light emitting diodes (LEDs).

15. A non-transitory computer-readable storage device encoded with computer program instructions that, when executed by one or more computers, cause the one or more computers to perform operations comprising:
determining that a network-enabled lightbulb is associated with a lightbulb camera system that comprises one or more cameras and one or more lights;
determining that a configuration of the one or more cameras or one or more lights has been adjusted; and
based on determining that the configuration of the lightbulb camera system has been adjusted, transmitting a command to adjust a configuration of the network-enabled lightbulb.

16. The non-transitory computer-readable storage device of claim 15, wherein:
determining that the configuration of the one or more cameras or one or more lights has been adjusted comprises determining that the one or more cameras has been turned on; and
transmitting the command to adjust the configuration of the network-enabled lightbulb comprises transmitting a command to turn on the network-enabled lightbulb.

17. The non-transitory computer-readable storage device of claim 15, wherein:
determining that the configuration of the one or more cameras or one or more lights has been adjusted comprises determining that the one or more cameras has been turned off; and
transmitting the command to adjust the configuration of the network-enabled lightbulb comprises transmitting a command to turn off the network-enabled lightbulb.

18. The non-transitory computer-readable storage device of claim 15, wherein
determining that the configuration of the one or more cameras or one or more lights has been adjusted comprises determining that the one or more lights has been turned on; and
transmitting the command to adjust the configuration of the network-enabled lightbulb comprises transmitting a command to turn on the network-enabled lightbulb has been turned on.

19. The non-transitory computer-readable storage device of claim 15, wherein the lightbulb camera system is placed within a vicinity of a location of the network-enabled lightbulb.

20. The non-transitory computer-readable storage device of claim 15, wherein the lightbulb camera system further comprises:
one or more processors;

a power-line communication (PLC) chip that is configured to enable communications between the lightbulb camera system and the network-enabled lightbulb;

a housing that encloses:
the one or more cameras,
the one or more lights, and
the PLC chip; and a lightbulb compatible screw base configured to (i) mount the housing to a lightbulb socket, and (ii) accept electrical current that is provided to the one or more cameras, the one or more lights, and the one or more processors.

* * * * *